(12) United States Patent
Pratte et al.

(10) Patent No.: US 8,158,245 B2
(45) Date of Patent: Apr. 17, 2012

(54) THERMOPLASTIC COMPOSITES AND METHODS OF MAKING AND USING SAME

(75) Inventors: James Francis Pratte, Wilmington, DE (US); Scott A. Rogers, Placentia, CA (US); Dominique Ponsolle, Winona, MN (US)

(73) Assignee: Cytec Technology Corp., Wilmington, DE (US)

( * ) Notice: Subject to any disclaimer, the term of this patent is extended or adjusted under 35 U.S.C. 154(b) by 0 days.

(21) Appl. No.: 12/887,287

(22) Filed: Sep. 21, 2010

(65) Prior Publication Data

US 2011/0097575 A1  Apr. 28, 2011

Related U.S. Application Data

(60) Provisional application No. 61/245,399, filed on Sep. 24, 2009.

(51) Int. Cl.
*B32B 27/04* (2006.01)
(52) U.S. Cl. ............ 428/300.7; 428/299.1; 428/299.4; 428/299.7; 427/407.1
(58) Field of Classification Search ............ 428/297.4, 428/299.1, 299.4, 299.7, 300.7, 336, 221, 428/212, 216; 427/407.1
See application file for complete search history.

(56) References Cited

U.S. PATENT DOCUMENTS

| | | | |
|---|---|---|---|
| 4,132,755 A | 1/1979 | Johnson | |
| 4,541,884 A | 9/1985 | Cogswell et al. | |
| 4,549,920 A | 10/1985 | Cogswell et al. | |
| 4,559,262 A | 12/1985 | Cogswell et al. | |
| 4,713,283 A | 12/1987 | Cogswell et al. | |
| 4,792,481 A | 12/1988 | O'Connor et al. | |
| 4,816,556 A | 3/1989 | Gay et al. | |
| 4,883,552 A | 11/1989 | O'Connor et al. | |
| 5,066,536 A * | 11/1991 | Cogswell et al. | 428/216 |
| 5,094,883 A | 3/1992 | Muzzy et al. | |
| 5,219,642 A * | 6/1993 | Meakin et al. | 428/212 |
| 5,721,034 A | 2/1998 | Seemann, III et al. | |
| 5,725,710 A | 3/1998 | Pfeiffer et al. | |
| 5,789,073 A | 8/1998 | Odagiri et al. | |
| 6,027,794 A | 2/2000 | Ozaki et al. | |
| 6,372,294 B1 | 4/2002 | Vodermayer et al. | |
| 6,616,971 B2 | 9/2003 | Evans | |

(Continued)

FOREIGN PATENT DOCUMENTS

EP      0320155 A2   6/1989

(Continued)

OTHER PUBLICATIONS

ISR/Written Opinion for PCT/US2010/049916 mailed on Feb. 10, 2011. Thermoplastic Composites: An Unfulfilled Promise. F.C. Campbell, "Manufacturing processes for advanced composites" 2004, Elsevier, Oxford, UK, XP002615944, ISBN: 1856174158. pp. 357-397, p. 360 361, p. 391.

*Primary Examiner* — N. Edwards
(74) *Attorney, Agent, or Firm* — Thi D. Dang

(57) ABSTRACT

Thermoplastic composites having a core composite layer including a fibrous substrate and one or more high performance polymer, and a surface layer polymer applied to at least one surface of the core composite layer, which forms a polymer blend with the high performance polymer thereby imparting improved toughness and processing times, and methods for making and using same, are provided herein.

17 Claims, 7 Drawing Sheets

U.S. PATENT DOCUMENTS

| | | |
|---|---|---|
| 6,709,995 B1 | 3/2004 | Dyksterhouse |
| 7,041,192 B2 | 5/2006 | Delanoy et al. |
| 7,126,096 B1 | 10/2006 | Matsen et al. |
| 7,137,182 B2 | 11/2006 | Nelson |
| 7,192,634 B2 | 3/2007 | Carter et al. |
| 7,810,757 B2 * | 10/2010 | Kirkwood et al. .......... 244/123.1 |
| 2011/0097575 A1 * | 4/2011 | Pratte et al. ................... 428/336 |

FOREIGN PATENT DOCUMENTS

| | | |
|---|---|---|
| EP | 0781648 A2 | 7/1997 |

* cited by examiner

1A

1B

20

10

Specimen #

1

2

3

4

Specimen #

5

6

7

8

THERMOPLASTIC COMPOSITES AND METHODS OF MAKING AND USING SAME

CROSS-REFERENCE TO RELATED APPLICATIONS

This application claims benefit of priority from U.S. Provisional Application No. 61/245,399, filed Sep. 24, 2009, which is incorporated by referenced herein in its entirety.

BACKGROUND OF THE INVENTION

1. Field of the Invention

The subject matter of the present invention relates to thermoplastic composite materials and prepregs used for creating structures that have a high strength-to-weight ratio. More particularly, in certain embodiments the present invention relates to layered thermoplastic composites for use in rapid lamination and forming processes, which composites possess an interlayer region containing at least one polymer that is high in crystallinity and either partially or fully crystallizes during the process window of the rapid lamination or forming process, and an outerlayer region containing a polymer that has low or no crystallization and is miscible and/or compatible with the polymer of the interlayer region, and has a lower melting and processing temperature than the polymer of the interlayer region. Such thermoplastic composites are useful in aerospace and other high-performance automotive/industrial applications.

2. Description of the Related Art

Reinforced thermoplastic and thermoset materials have wide application in, for example, the aerospace, automotive, industrial/chemical, and sporting goods industries. Thermosetting resins are impregnated into the reinforcing material before curing, while the resinous materials are low in viscosity. Thermoset composites suffer from several disadvantages. Low molding pressures are used to prepare these composites to avoid damage to the fibers. These low pressures, however, make it difficult to suppress the formation of bubbles within the composite which can result in voids or defects in the matrix coating. Thus, most processing problems with thermoset composites are concerned with removing entrained air or volatiles so that a void-free matrix is produced. Thermoset composites made by the prepreg method require lengthy cure times with alternating pressures to control the flow of the resin as it thickens to prevent bubbles in the matrix. While current fabrication of large structures utilize robotic placement of the thermoset composite material to increase production rate, its overall production rate for the component is limited by the lengthy cure in the autoclave process step and related operations to prepare the material for that process step. Some high volume processes, such as resin infusion avoid the prepreg step but still require special equipment and materials along with constant monitoring of the process over the length of the cure time (e.g. U.S. Pat. Nos. 4,132,755, and 5,721,034). Although thermoset resins have enjoyed success as in lower volume composites applications, the difficulties in processing these resins has limited their use in larger volume applications.

Thermoplastic compositions, in contrast, are more difficult to impregnate into the reinforcing material because of comparatively higher viscosities. On the other hand, thermoplastic compositions offer a number of benefits over thermosetting compositions. For example, thermoplastic prepregs can be more rapidly fabricated into articles. Another advantage is that thermoplastic articles formed from such prepregs may be recycled. In addition, damage resistant composites with excellent performance in hot humid environments may be achieved by the proper selection of the thermoplastic matrix. Thermoplastic resins are long chain polymers of high molecular weight. These polymers are highly viscous when melted and are often non-Newtonian in their flow behavior. Thus, whereas thermosets have viscosities in the range of 100 to 5,000 centipoise (0.1 to 5 Pa*s), thermoplastics have melt viscosities ranging from 5,000 to 20,000,000 centipoise (5 to 20,000 Pa*s), and more typically from 20,000 to 1,000,000 centipoise (20 to 1000 Pa*s). Despite a viscosity difference of three orders of magnitude between thermosets and thermoplastics, some processes have been applied to both types of matrices for laminating fibrous materials.

Fiber-reinforced plastic materials may be manufactured by first impregnating the fiber reinforcement with resin to form a prepreg, then consolidating two or more prepregs into a laminate, optionally with additional forming steps. Due to the high viscosity of thermoplastics, most of the processes to form thermoplastic prepregs involve coating the outside of the fiber bundles with a thermoplastic polymer powder rather than coating individual filaments. The polymer powder is then melted to force the polymer around, into and onto the individual filaments. A few processes apply melt directly to the fibers. A tape can be made by coating a dry web of collimated fibers with the polymer and applying a heated process that forces the polymer into and around the fibers (e.g., see U.S. Pat. Nos. 4,549,920 and 4,559,262). Another process used to coat and impregnate a dry web of collimated fibers is by pulling the web through an aqueous slurry of fine thermoplastic polymer particles whereby the polymer particles are trapped within the filament bundles. Subsequent heat and pressure in the process boils off the water and then melts the polymer to force it into and around the filament bundles. This process is described in U.S. Pat. Nos. 6,372,294; 5,725,710; 4,883,552 and 4,792,481. A modification to the aqueous slurry impregnation process is to eliminate the use of water and surfactant as dispersing agents for the polymer particles and instead electrostatically charge the particles in a fluidized bed of air to trap the particles in the filament bundle. Subsequent zones of heat and pressure melt the polymer to coat/impregnate the filament bundle as given in U.S. Pat. No. 5,094,883. Thus, for those skilled in the art, there are multiple methods to coat and/or impregnate a fibrous substrate given the available process equipment, and proper selection of polymer product form (flake, fine powder, film, non-woven veil, pellets) and melt viscosity. Known methods for the fabrication of composite articles include manual and automated fabrication. Manual fabrication entails manual cutting and placement of material by a technician to a surface of the mandrel. This method of fabrication is time consuming and cost intensive, and could possibly result in non-uniformity in the lay-up. Known automated fabrication techniques include: flat tape laminating machines (FTLM) and contour tape laminating machines (CTLM). Typically, both the FTLM and the CTLM employ a solitary composite material dispenser that travels over the work surface onto which the composite material is to be applied. The composite material is typically laid down a single row (of composite material) at a time to create a layer of a desired width and length. Additional layers may thereafter be built up onto a prior layer to provide the lay-up with a desired thickness. FTLM's typically apply composite material to a flat transfer sheet; the transfer sheet and lay-up are subsequently removed from the FTLM and placed onto a mold or on a mandrel. In contrast, CTLM's typically apply composite material directly to the work surface of a mandrel. FTLM and CTLM machines are also known as automated tape laydown (ATL) and automated fiber placement (AFP) machines with the dispenser being commonly referred to as a tape head.

The productivity of ATL/AFP machines is dependent on machine parameters, composite part lay-up features, and material characteristics. Machine parameters such as start/stop time, course transition time, and cut/adding plies determine the total time the tape head on the ATL/AFP is laying material on the mandrel. Composite lay-up features such as localized ply build-ups and part dimensions also influence the total productivity of the ATL/AFP machines. Key material factors that influence ATL/AFP machine productivity are similar for a thermoset resin matrix composite when compared with a thermoplastic matrix composite yet there are a couple of key differences. For thermoset resin matrix composites, key factors are impregnation levels, surface resin coverage, and "tack". "Tack" is the adhesion level necessary to maintain the position of the tape/tow on the tool or lay-up after it has been deposited on it. Thermoset resins are partially reacted and therefore "tack" is achieved through a combination of molecular diffusion between the two laminating surfaces and chemisorption between the polar, unreacted chemical moieties. Due to the unreacted nature of the thermoset resin, the ATL/AFP process is generally performed at room temperature but in humidity controlled rooms due to the moisture sensitivity on the tack level of the material.

Thermoplastic matrix composites have similar key factors as thermoset matrix composites for ATL/AFP machine productivity but since the thermoplastics polymer matrices are generally fully reacted in the tape it lacks "tack" at ambient conditions. The fully reacted thermoplastics generally have low surface energies making adhesion at room temperature unlikely. Furthermore, the high performance thermoplastic matrices are in their "glass" state at room temperature making the molecular diffusion mechanism for "tack" virtually impossible. Thus, "tack" is achieved in thermoplastic composites by dynamically applying additional energy in the form of thermal, ultrasonic, optical (laser), and/or electromagnetic (induction) to the lay-up and incoming tape to raise the temperature of the materials above their softening and/or melt temperature in order to facilitate molecular diffusion of the polymer chains to occur between the two surfaces. Once the polymer chains have diffused across the surface, the additional energy added to the materials needs to be removed to a level that will prevent distortion of the laminated lay-up once the lamination pressure from the ATL/AFP head is removed. This rapid flux of energy into and out of the lay-up makes it desirable from an energy usage and lay down speed to perform this process step at the lowest possible temperature and energy without compromising on the temperature performance of the resulting composite part.

Consolidation is typically necessary to remove voids that result from the inability of the resin to fully displace air from the fiber bundle, tow, or roving during the processes that have been used to impregnate the fibers with resin. The individually impregnated roving yarns, tows, plies, or layers of prepregs are usually consolidated by heat and pressure by compacting in an autoclave. The consolidation step has generally required the application of very high pressures and high temperatures under vacuum for relatively long times. Furthermore, the consolidation process step using an autoclave or oven requires a "bagging" operation to provide the lay-up with a sealed membrane over the tool to allow a vacuum to be applied for removal of air and to provide the pressure differential necessary to effect consolidation in the autoclave. This process step further reduces the total productivity of the composite part operation. Thus, for a thermoplastic composite it would be advantageous to in-situ consolidate to a low void composite while laminating the tape to the substrate with the ATL/AFP machine. This process is typically referred to as in-situ ATL/AFP and the material used in that process called an in-situ grade tape.

In general, thermoplastic composites have had limited success to date, due to a variety of factors including high processing temperatures (currently around 400° C.), high pressures, and prolonged molding times needed to produce good quality laminates. Most of the efforts have been focused on combining high performance polymers to structural fibers which has only exacerbated the process problems. Because the length of time typically required to properly consolidate the prepreg plies determines the production rate for the part, it would be desirable to achieve the best consolidation in the shortest amount of time. Moreover, lower consolidation pressures or temperatures and shorter consolidation times will result in a less expensive production process due to lowered consumption of energy per piece for molding and other manufacturing benefits.

Accordingly, the fiber-reinforced thermoplastic materials and methods presently available for producing light-weight, toughened composites require further improvement. Thermoplastic materials having improved process speeds on automated lay-up machines and lower processing temperatures, and having no autoclave or oven step would be a useful advance in the art and could find rapid acceptance in the aerospace and high-performance automotive industries, among others.

SUMMARY OF THE INVENTION

The discovery detailed herein provides lower melting, slower crystallizing semi-crystalline polymer films that are applied to a surface (for example via lamination) of a core containing a tape or tow impregnated with a higher melting, faster crystallizing matrix polymer, and which can be initially processed at a melt process temperature of the surface polymer, but upon cool down crystallizes at rates intermediate to the faster crystallizing matrix polymer. This discovery is useful, for example, in developing an in-situ grade thermoplastic tape and towpreg that can be processed on an Automated Tape Laydown/Automated Fiber Placement (ATL/AFP) machine at comparable speeds as a thermoset based tape, with the exception that no post autoclave or oven step is required after lay down. Cost modeling of the part fabrication has shown that 30% of the fabrication cost (recurring) can be saved by eliminating the post-processing (autoclave/oven) step. Furthermore, this discovery will also reduce the initial capital and facility cost investment to produce large composites.

Accordingly, the invention described in detail herein provides, in one aspect, thermoplastic compositions having a core composite layer that includes a fibrous substrate and at least one high performance polymer, and a surface layer polymer chosen from an amorphous polymer, a slow crystallizing semi-crystalline polymer, or combinations thereof, such that the surface layer polymer is applied on at least one surface of the core composite layer and forms a polymer blend with the high performance polymer, and wherein the $T_m$ and $T_{process}$ of the surface layer polymer is at least 10° C. less than the $T_m$ and $T_{process}$ of the high performance polymer of the core composite layer.

In another aspect, the invention relates to articles of manufacture made from the thermoplastic composites according to the invention described herein. Such articles are useful, for example, in the aircraft/aerospace industries among others.

Also provided by the present invention are methods for manufacturing the thermoplastic compositions described in detail herein by impregnating and/or coating the fibrous substrate with at least one high performance polymer, and applying a surface layer polymer as described in detail herein on at least one surface of the core composite layer, thereby forming a polymer blend between the surface layer polymer and the high performance polymer of the core composite layer.

In-situ grade thermoplastic composite tapes for use on an automated tape laydown or automated fiber placement machine are also provided.

These and other objects, features and advantages of this invention will become apparent from the following detailed description of the various aspects of the invention taken in conjunction with the accompanying Figures and Examples.

DETAILED DESCRIPTION OF CERTAIN EMBODIMENTS OF THE INVENTION

Figure 1:
FIG. 1: An embodiment of a thermoplastic composite according to the invention: (A) Bi-layer composite; (B) Tri-layer composite. Either slow crystallizing, lower melting thermoplastic polymer or amorphous polymer as surface polymer 10 that is miscible and/or compatible with fast crystallizing, high melting high performance polymer of core matrix 20.
Figure 1:
Figure 2A:
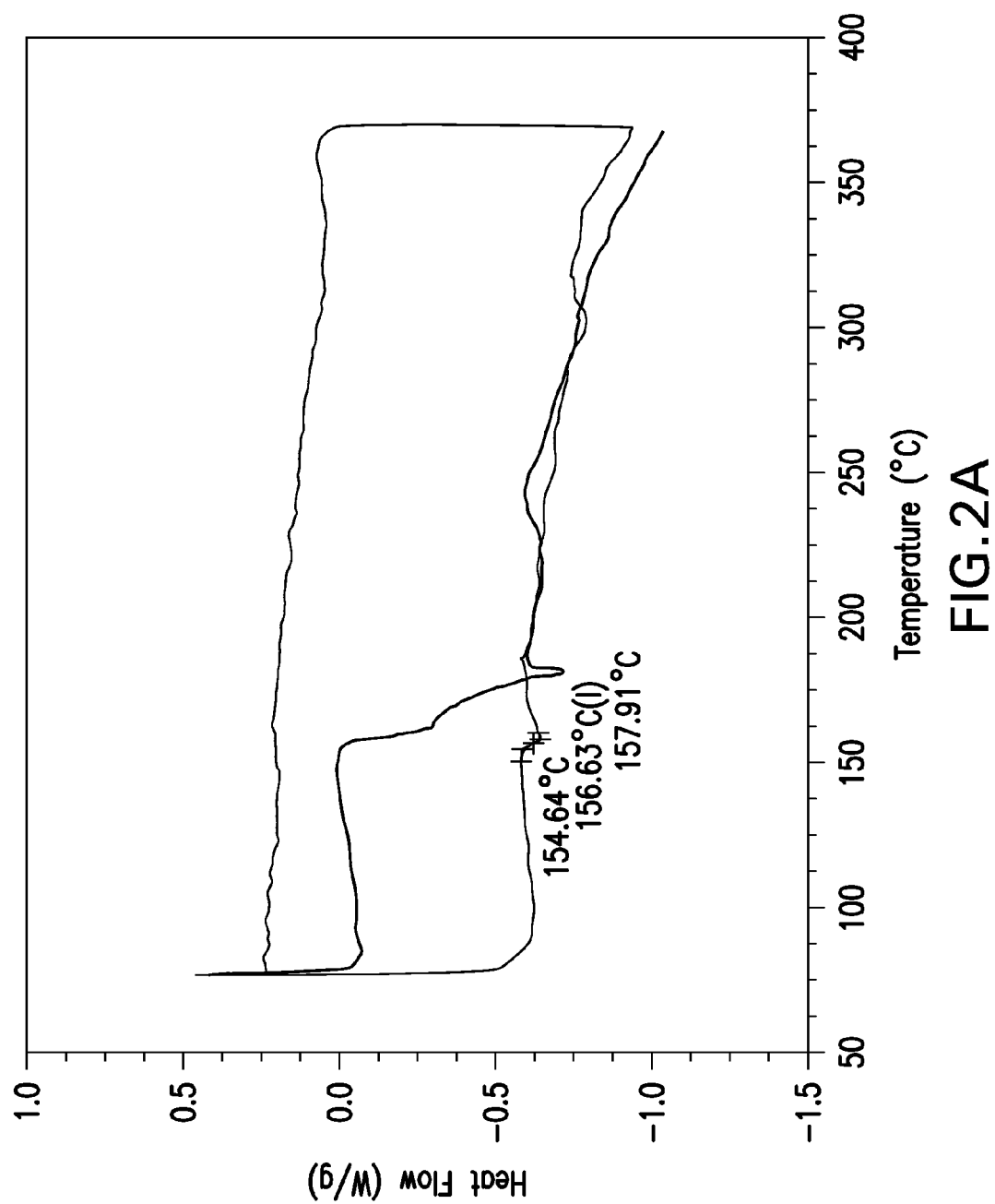
FIG. 2: Differential Scanning calorimeter (DSC) curves-CYPEK® PEKK DS-E film (A); APC-2 PEEK/IM7 Tape (B); (C) Combined Tape-Laminate APC-2 PEEK/IM-7 with CYPEK® PEKK DS-E film (G) shows a strong signal in the early part of the DSC curve that can be assigned to the 6 micron CYPEK® PEKK DS-E polymer layer on the tape surface. This polymer has a melt fusion peak around 300° C. and this can be seen in the first heat curve. The CYPEK® PEKK DS-E polymer with a cooling rate of 10° C. and above will not have a crystallization peak on cool down. The laminated APC-2/IM-7 with PEKK (CYPEK® PEKK DS-E) has a peak crystallization temperature similar to the base APC-2 PEEK/IM-7 tape at 309° C., thereby suggesting that the surface layer of CYPEK® PEKK DS-E did not have an adverse effect on the crystallization rate of the laminated materials; Laminate APC-2/IM-7 with CYPEK® PEKK DS-E (C) shows a curve that behaves more like the base tape APC-2 PEEK/IM-7 material with no cold crystallization peak that might occur with CYPEK® PEKK DS-E being in the amorphous state. The curves indicate that the base tape APC-2 PEEK/IM7, which crystallizes much faster than CYPEK® PEKK DS-E, is nucleating and accelerating the crystallization rate of the CYPEK® PEKK DS-E surface layer polymer.
Figure 2B:
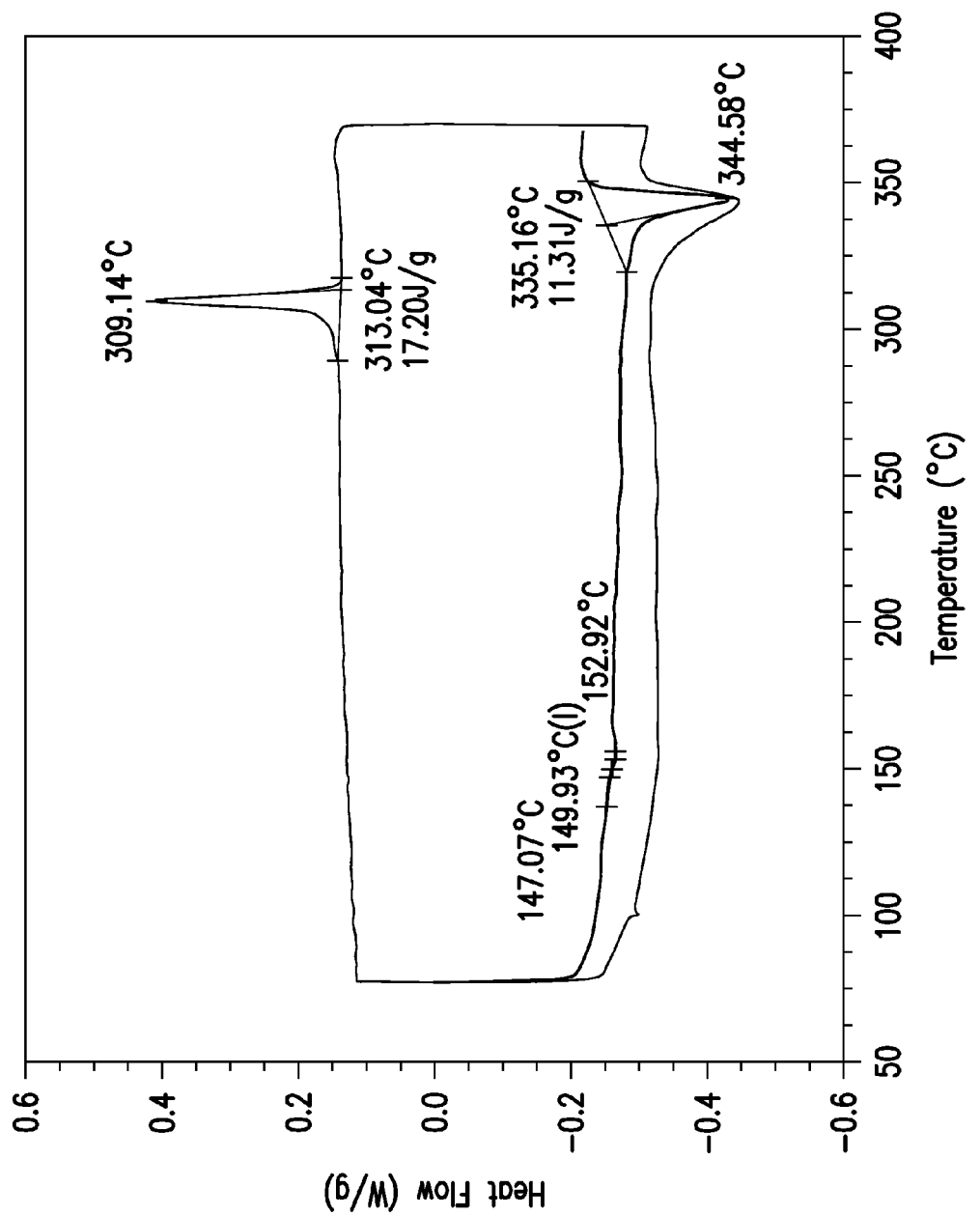
Figure 2C:
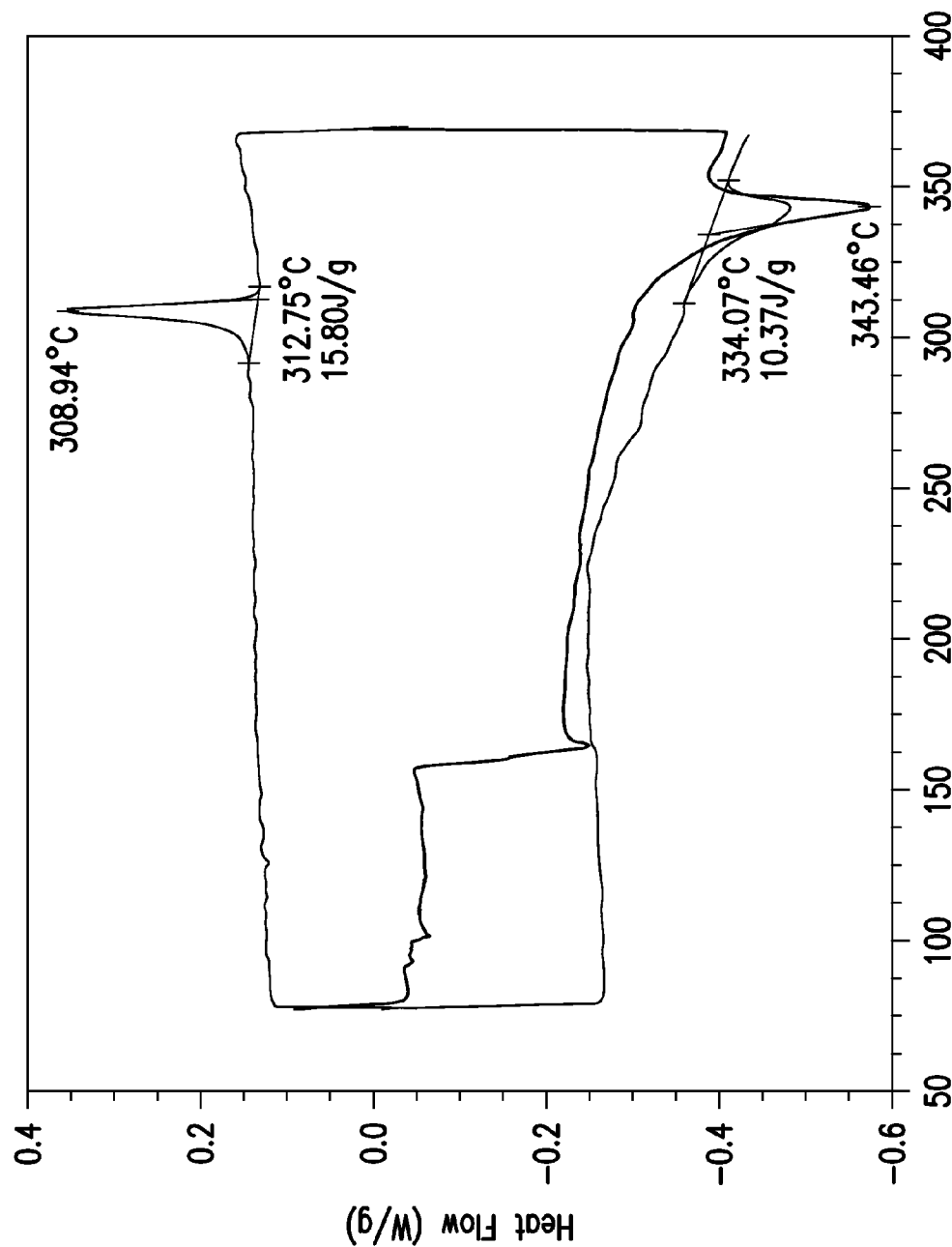

As summarized above, the discovery provides thermoplastic composite containing a unique resin-rich layer on one or more surfaces of a core composite layer containing a fibrous substrate that is impregnated with one or more high performance polymer. The unique resin-rich layer provides improved wetting and bonding of in-situ placed thermoplastic composite materials at higher lay-down speed than is possible with a typical thermoplastic prepreg composite material. Such a unique resin-rich layer can be applied to any core matrix containing a fibrous material typically used in thermoplastic impregnation manufacturing methods including, but not limited to, unidirectional tape or web, fiber tow/preg, or fabric, and non-woven materials such as a mat or veil. Fiber reinforced composite materials are generally categorized as tape, woven cloth, non-woven cloth, paper, and mixtures thereof. "Tape" generally refers to uniaxial reinforcement fibers that extend along a single axis of the strip material. The term "cloth" generally refers to reinforcement fibers laid along at least two different axes within the strip material. Cloth is commercially available as bi-axial, tri-axial and quad-axial, indicating fibers extending in two, three, or four different axes, respectively. The fibers may optionally be woven with one another, or may be manufactured as non-woven cloth. A vast array of composite reinforcement fibers are commercially available, such as for example, carbon fibers, Kevlar® fibers, glass fibers, aramid fibers, and mixtures thereof. Metal foils are also known in the art, and may be included in composite articles. Such metal foils are frequently interspersed as material layers within the lay-up composite. Strip materials are commercially available in a wide variety of widths. One common width for fiber reinforced material strips is 6 inches. The present invention contemplates and is adaptable to a variety of strip material widths.

Core Composite Layer

Substrate

The core composite layer element (or base) of the thermoplastic composites described herein contains a fibrous substrate and a uniformly distributed, high performance thermoplastic polymer resin. In certain embodiments, the fibrous substrate can include, but is not limited to, carbon fibers, glass fibers, aramid fibers and mixtures thereof. In one embodiment, for example, the fibrous substrate is a polyacrylonitrile (PAN) based carbon fiber.

In certain embodiments the fibrous substrate includes 50% to 80% by weight of the total weight of the thermoplastic composite. The fibrous substrate can be a unidirectional tape (uni-tape) web, non-woven mat or veil, fiber tow, or fabric material that has been impregnated with at least one high performance polymer via any manufacturing/impregnation method known to those of skill in the art. Suitable impregnation methods are known to those of ordinary skill in the art and include, for example and without limitation, hot-melt impregnation, aqueous slurry impregnation, powder coating, extrusion film lamination, and combinations thereof.

High Performance Polymer

It is an object of this invention to achieve thermoplastic composite tape and/or ribbons having lower processing temperatures while still maintaining performance targets known to high performance polymers. Accordingly, the uniformly distributed thermoplastic resin of the core composite layer is a high performance polymer that has a higher melting temperature and faster crystallization rate than that of the surface layer polymer. As used herein, the term "high performance polymer" is meant to refer to any thermoplastic polymer that has a melting temperature (Tm) greater than or equal to 280° C. and a process temperature (Tprocess) greater than or equal to 310° C. In certain embodiments, the higher performance polymer of the core composite layer is chosen from polyaryletherketones (PAEK), PAEK blends, polyimides, and polyphenylenesulfides (PPS). These polymers are all well known to those skilled in the thermoplastic arts and are readily and commercially available.

In certain embodiments the PAEK is chosen from polyetheretherketone (PEEK), polyetheretherketoneketone (PEEKK), polyetherketoneketone (PEKK), polyetherketone (PEK), and polyetherketoneketoneetherketone (PEKKEK).

It is well known that the melting point and crystallinity rate of PEKK can be changed by adjusting the terephthaloyl ("T") to isophthaloyl ("I") ratio ("T:I ratio"). In the current synthesis of PEKK, the "T" and "I" are controlled by the relative amounts of, terephthaloyl chloride and isophthaloyl chloride to make block co-polymer. Without wishing to be bound by theory, it is believed that increasing the amount of "I" segments puts more "kinks" in the polymer backbone, thereby slowing the rate and activation energy for a chain rotation to achieve the minimum energy configuration for crystalline formation. This results in a lower melt temperature and slower crystallization rate. In order to achieve the performance objectives of the thermoplastic compositions according to the present invention, however, the high performance polymer needs to crystallize within the time frame of the process. Thus, the high performance polymer in the core composite layer must be fast-crystallizing (i.e., less than about 7 seconds). For this reason it is preferable that in certain embodiments the high performance polymer is present in a semi-crystalline state with greater than 20% crystallinity (i.e., having a high crystalline composite). Accordingly, when the high performance polymer is chosen from polyetherketoneketone (PEKK) it has a T:I ratio from 70:30 to 100:0. For example, two of the embodiments include CYPEK® HT and CYPEK® FC which have T:I ratios in the 70:30 to 100:0 range. Although PEKK-type polymers can be used that have T:I ratios below 70:30, a nucleating agent must also be used to increase the rate at which the polymer crystallizes to approach that of the polymers with T:I ratios 70:30-100:0. Carbon black is one example of such a nucleating reagent. Blending a polymer with a higher T:I ratio (e.g., 90:10) into the polymer with a T:I ratio of 55:45 can also increase the rate of crystallization. Other nucleating reagents suitable for use with the present invention are also known to those skilled in the composite arts and are also contemplated for use with the current invention.

Polyaryletherketones are well known to those skilled in the composite arts and can include, but are not limited to, APC-2® PEEK, CYPEK®-FC and/or CYPEK®-HT, which are all commercially available from Cytec Engineered Materials/Cytec Industries Inc., Woodland Park N.J.

In still other embodiments, the high performance polymer is a PAEK blend having polyetherimide, polyphenylene sulfide and/or polyethersulfone mixed in with one or more polyaryletherketones. The high performance polymer can also be chosen from polyimides such as, for example, Aurum N-TPI® and Avimid K3B®.

The content of the high performance polymer in the core composite layer ranges from 26% to 90% by weight of the total polymer content in the composite thereby providing the core composite layer with a resin modulus above 500 ksi and an interlaminar fracture toughness above 600 J/m$^2$ as measure by $G_{1c}$. The viscosity of the high performance polymer is adjusted so that good filament wet out is obtained. Ultimately the high performance polymer of the core composite layer acts as part of a polymer matrix and forms a polymer blend with the surface layer polymer when that polymer is applied to the core composite layer. As used herein, the term "polymer blend" includes miscible and compatible polymer blends as those terms are known and understood by those skilled in the art to which the invention pertains.

Surface Layer Polymer

Accordingly, the surface layer polymer is applied on one or more surface of the core composite layer. When the surface layer polymer is on only one surface of the core composite layer a bi-layer composite is formed. When it is on two surfaces of the core composite layer, the resulting composite structure is referred to as a tri-layer. Because a compatible and/or miscible blend between the high performance polymer of the core composite matrix and the surface layer polymer is desired, the surface layer polymer is chosen such that it has a lower melting point and processing temperature than the high performance polymer. In certain embodiments, the melting and/or processing temperature of the surface layer polymer is at least 10° to 20° C. (e.g., 10° C., 11° C., 12° C., 13° C., 14° C., 15° C., 16° C., 17° C., 18° C., 19° C., or 20° C.) less than the melting and/or processing temperature of the high performance polymer.

The morphology of the surface layer polymer can be amorphous and/or a slow crystallizing (i.e., low crystallinity—typically less than 20% crystallinity) semi-crystalline polymer. Blends of the amorphous and semi-crystalline polymers are also specifically contemplated for use as the surface layer polymer by the present invention. In certain embodiments the surface layer polymer is chosen from polyaryletherketones (PAEK), polyetherimide (PEI), polyimides, PAEK co-polymer with PEI and/or polyethersulfone (PES) and/or polyphenylenesulfide (PPS), and PAEK blends with one or more of PEI, PES, PPS and/or polyimides.

In a particular embodiment, for example, the surface layer polymer includes PAEK chosen from PEEK or PEKK blended with, such as, but not limited to, diphenylsulfone. When the surface layer polymer includes PEKK, the T:I ratio of the PEKK ranges from 0:100 to 70:30 in order to maintain the slow crystallization rate of the surface layer polymer. In a particular embodiment, the T:I ratio of the surface layer polymer uses CYPEK® DS that has a T:I ratio in the 0:100 to 70:30 range. Suitable PEKK polymers available for use with the present invention include, but are not limited those commercially available from Cytec Industries Inc., Woodland Park N.J., such as CYPEK® DS-E or CYPEK® DS-M.

The resulting surface layer possesses a fracture toughness $K_{1c} \geq 1.5$ MPa-m$^{0.5}$. The surface layer polymer is applied to the core composite layer at a thickness in the range from 1 to 20 microns per layer. In some embodiments, the thickness of the surface layer can be in the range of from 1 to 10 microns per layer; in other embodiments, it can range from 4 to 6 microns per layer. Accordingly, in a tri-layer configuration the thickness of the surface layer polymer can range from 2 to 40 microns. The thermoplastic composite as a whole can range from a thickness of from 25 to 400 microns.

In certain embodiments, the surface layer polymer can further include a multi-functional agent chosen from a metallic coating and/or micro- and/or nano-particles. Such multi-functional agents can enhance the composite features of the substrate, thereby improving electrical conductivity, toughness, oxygen permeability crystallization rate and/or solvent resistance of the thermoplastic composite.

The surface layer polymer and/or high performance polymer and/or core matrix may further include one or more additives such as, but not limited to, impact modifiers, mold release agents, lubricants, thixotropes, antioxidants, UV absorbers, heat stabilizers, flame retardants, pigments, colorants, nonfibrous reinforcements and fillers, nano-graphite platelets, to enhance crystallinity rate and mitigate shrinkage, nano-clays to improve solvent resistance, nano-metals (such as nickel fibrils), particle interleaving for impact toughening, CVD veil fabrics in interleave for OML lightning strike, fiber or polymer veils to improve impact performance, surface finishes to aid in air removal as the pressure is applied by the ATL machine, and high flow surface coatings to speed reptation healing across the inter-ply region.

Composites

Using the core matrix and surface layer polymer described above, a thermoplastic composite is provided with a resin rich surface with a total resin content (i.e., resin content of high performance polymer+resin content of surface layer polymer) in the range of 30-95% by weight of the total composite is achieved by laminating or coating the surface of a higher melting thermoplastic tape or prepreg of a low resin content with a lower melting miscible or compatible polymer having a thickness in the range of 1 to 20 microns. The total thickness of a thermoplastic composite according to the present invention ranges from 25 to 400 microns. When the thermoplastic composite of the present invention is a tape, for example, the lower processing temperature polymers are located at the surface where the ply lamination process dynamics take place. This allows for the surface coating of the lower processing temperature polymer (i.e., the surface layer polymer) to be melted, fused, and surface smoothed to the core matrix/base tape, thereby achieving an in-situ grade placeable thermoplastic tape or towpreg. By having a smooth, flat surface layer, the physics of the lamination for a tape, for example, would be such that "intimate contact" between the two lamination surfaces (i.e., core matrix/base and surface layer polymer) would occur within a few seconds of the contact initiation.

By way of non-limiting example, CYPEK® DS-E crystallizes very slowly thereby leaving the laminated film on the surface of the tape in an amorphous state that could fuse at a temperature 20-30° C. above the Tg before the onset of crystallization. CYPEK® DS grade PEKK crystallizes by as much as an order of magnitude faster when blended with a faster crystallizing polyaryletherketone such as PEEK, CYPEK® FC, and CYPEK® HT Thus, while this surface layer may start in the amorphous state it eventually will crystallize after multiple passes of the in-situ tape head over the area during the tape placement process. The net result is to have alternating layers of highly crystalline areas with interlaminar layers that are less crystalline. Composite structures made in this way will have, for example, lower processing temperature than the base tape by a minimum of 10° C., interlayer region that is either partially or fully crystallized during the process window of an in-situ thermoplastic placement process, interlayer region that is lower in crystallinity and hence stiffness that would lead to good impact resistance and improved solvent resistance due to lower residual stress build up in the interlayer, and a process for making layered tape by either film lamination to a low resin content tape, or by powder/solvent coating a low resin content tape.

The thermoplastic composites of the invention may be formed into various articles using rapid lamination and forming processes including, but not limited to, in-situ thermoplastic tape/tow placement for stiffened wing and fuselage skins, continuous compression molding (CCM) and roll forming process for stiffener fabrication, double belt press to make consolidated flat panels and aircraft floor panels, in-situ filament wound cylindrical structures, and fusion bonding and welding of composite assembly.

Methods

The present invention also provides methods for manufacturing a thermoplastic composition that has a thickness in the range of 25 to 400 microns and that has improved processing temperature and processing times on ATL machines and manufacturing equipment by impregnating and/or coating a fibrous substrate with a core composite layer that includes a high performance thermoplastic polymer, and applying a surface layer polymer on at least one surface of the core composite layer. As discussed throughout this specification, the surface layer polymer is chosen from either a slow crystallizing, semi-crystalline polymer or an amorphous polymer (or mixtures thereof), such that the surface layer polymer forms a miscible and/or compatible blend with the high performance polymer of the core composite layer. The resulting thermoplastic composition possesses the characteristics as detailed throughout the instant specification and claims. Similar steps are also provided for providing an in-situ grade thermoplastic composite tape.

In manufacturing the thermoplastic compositions of the invention, the surface layer polymer is applied to the core composite layer by any suitable means known in the art including, but not limited to, powder or solvent coating, film lamination, non-woven veil lamination, flame/plasma spray coating (such as Thermal Spray System by Resodyn, Montana), and combinations thereof. or the surface layer polymer can be laminated. The laminated tape or substrate can then be cooled. The fibrous substrate can be chosen from any of the fibers as previously detailed above and the substrate or tape can be laminated on one or two surfaces.

EXAMPLES

The following examples are provided to assist one skilled in the art to further understand certain embodiments of the present invention. These examples are intended for illustration purposes and are not to be construed as limiting the scope of the various embodiments of the present invention.

Example 1

Film Lamination Using Bi- or Tri-Layer In-Situ Thermoplastic Tape

A small press is heated to between 290° C. and 410° C. Kapton film is coated with a release agent and, with the press at the desired temperature, a bi- or tri-layer configuration is sandwiched between two pieces of the release agent coated Kapton film, thereby forming a lay-up. The lay-up is placed between the two 3"×3" stainless steel caul plates of the press along with a thermocouple. The stack is inserted into the press and 1,000 lbs. of pressure is applied and held for a period of between 10 and 30 seconds. The pressure and top platen is then released and the stack is removed to cool under a cold press (1000 lbs. for 1 minute).

Example 2

Comparative

Figure 3A:
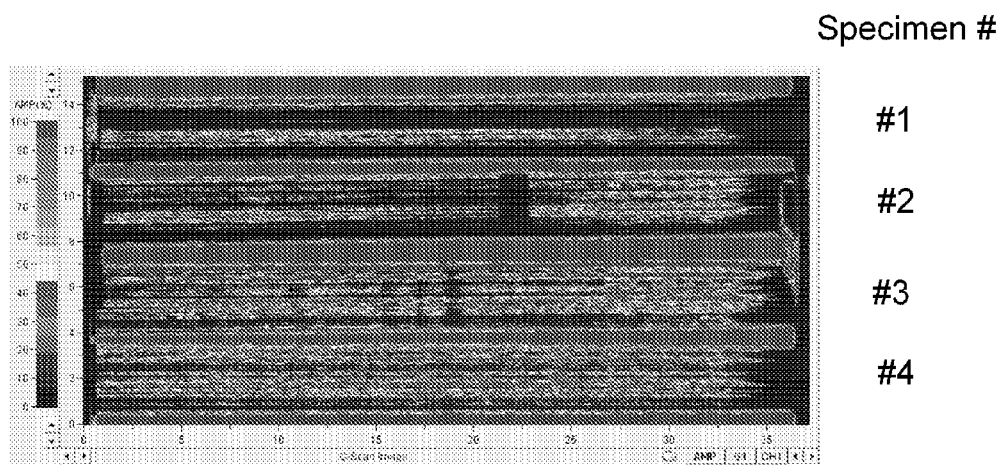
FIG. 3: Ultrasonic Scan of in-situ ATP lay-down-(A) base APC-2 PEEK/IM7 unidirectional tape; (B) tri-layer CYPEK® PEKK DS-E//APC-2 PEEK/IM7//CYPEK® PEKK DS-E unidirectional tape. Red color indicates high signal transmission that is indicative of a low void composite (preferred), while the blue color indicates high signal loss due to high porosity in the laminate.
Figure 3B:
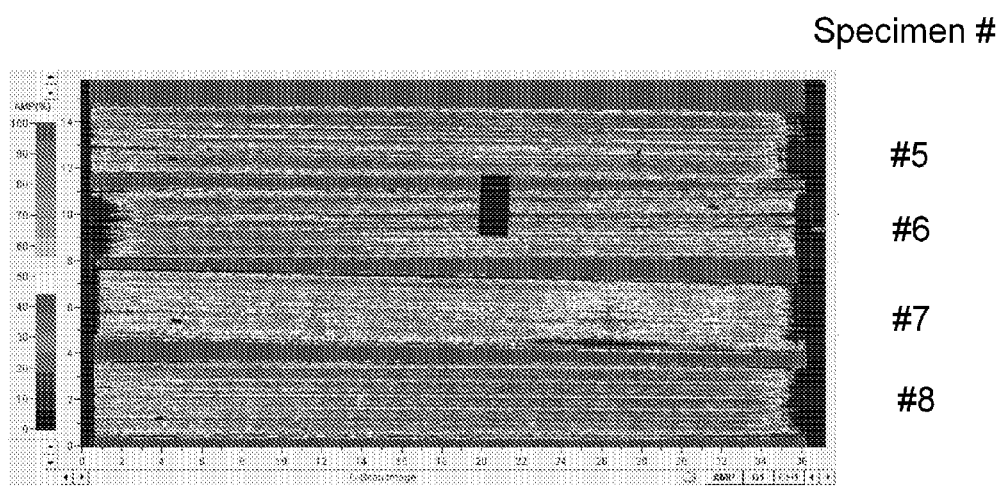

An in-situ lay-down of a thermoplastic composite using laminated APC-2/IM7 Unitape and Tri-layer laminated PEKK DS-E//APC-2/IM7//PEKK DS-E is performed using a thermoplastic automated tape laydown machine from Accudyne Systems Inc. (see U.S. Pat. No. 7,404,868). Laminates of a size 75 mm×1000 mm and a lay-up orientation of [0°]20 (20 ply unidirectional lay-up) are in-situ consolidated/placed. Key process parameters are Temperature (Lay-down temperature for fusing the tape to the laminate), Pressure (Head pressure to fuse the tape to laminate), and Speed (Speed of fusing the tape to the laminate). The run conditions and results for the in-situ ATL are reproduced in the table below and in FIGS. 3A and 3B.

| Panel # | Material | Temp. °C. | Pressure % Max | Speed ft/min | SBS Avg ksi | SBS std dev | Resin wt. % | Void Vol % |
|---|---|---|---|---|---|---|---|---|
| 1 | APC-2 | 360 | 75 | 5 | 10.1 | 0.3 | 31.2 | 3.08 |
| 2 | APC-2 | 360 | 100 | 10 | 10.5 | 0.4 | 31.3 | 3.29 |
| 3 | APC-2 | 410 | 75 | 10 | 10.7 | 0.2 | 33.1 | 2.77 |
| 4 | APC-2 | 410 | 100 | 5 | 11 | 0.7 | 31.2 | 2.68 |
| 5 | Tri-layer | 360 | 75 | 5 | 12 | 0.2 | 32 | 2.14 |
| 6 | Tri-layer | 360 | 100 | 10 | 11.8 | 0 | 33 | 2.72 |
| 7 | Tri-layer | 410 | 75 | 10 | 11.7 | 0.3 | 31.8 | 1.58 |
| 8 | Tri-layer | 410 | 100 | 5 | 12.6 | 0.4 | 34.7 | 1.31 |

The data in the above table consistently shows that the Tri-layer tape for a given condition compared with the APC-2/IM7 having lower void content in the laminate. This is also confirmed by the ultrasonic scans in FIGS. 3A and 3B. The Tri-layer laminates also have higher short beam shear strength (SBS) than the baseline APC-2/IM7 tape which further suggests improved consolidation of the plies. Furthermore, Tri-layer panel #5 that has a lay down temperature of 360° C. has lower void content and higher SBS value than the baseline APC-2/IM7 panel 4 which is processed with a higher laydown temperature (410° C.) and pressure (100% vs 75%) with the same head speed. These observations confirm that the Tri-layer tape is producing better quality laminations at lower lay-down temperatures while maintaining good performance.

Example 3

Cypek® PEKK DS-E Inter-Ply Testing

Figure 4A:
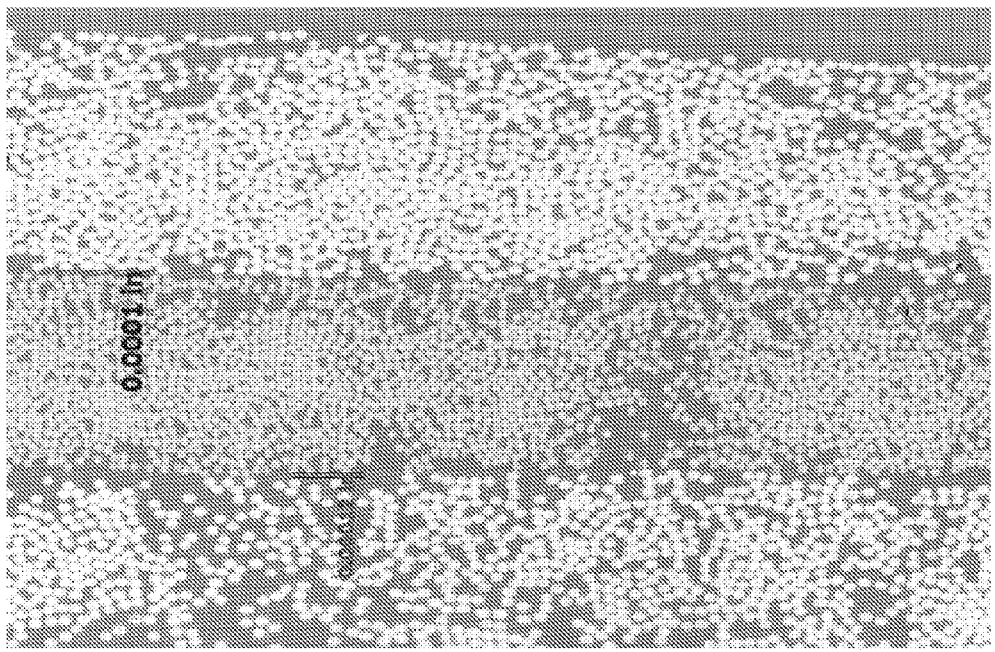
FIG. 4: Micrograph cross-sections of thermoplastic compositions: (A) PEKK DS-M AS-4 Laminate Control; (B) PEKK DS-M AS-4 with 0.25 mm PEKK DS-E. PEKK DS-E film (4B) acts as an inter-ply spacer that increases the space between the plies, whereas the control (4A) has almost filament-to-filament contact between the plies.
Figure 4B:
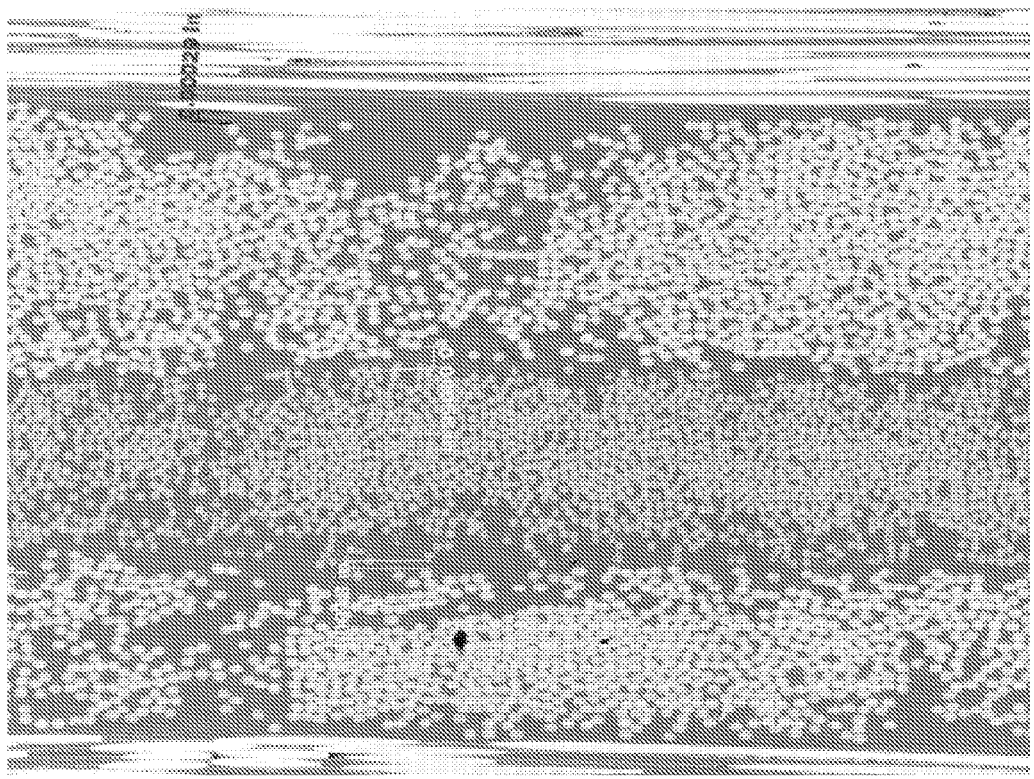

A laminate comprising 32 plies of uni-directional APC-PEKK-DS-M/AS-4 thermoplastic tape is prepared for consolidation as a test control article. An additional laminate is prepared according to the invention as described herein in detail, and includes two (2) sheets of Cypek® PEKK DS-E grade polymer film of 0.25 mm nominal thickness between each ply of APC-PEKK-DS-M/AS-4 thermoplastic tape. (FIGS. 4 A-B). Cypek® PEKK DS-E has the same chemical back bone of Cypek® PEKK DS-M used as the resin matrix in the APC-PEKK DS-M/AS4 thermoplastic tape, but has a weight average molecular weight that is 50% higher. Both panels are processed under vacuum in an autoclave at a pressure of 100 psi of $N_2$ gas at a temperature of 391° C. for 20 minutes. The subsequent laminates are subjected to ultrasonic scan (C-scan) to confirm the quality of the laminates. The laminates are then subjected to 1500 in-lb. impact events and then are subjected to mechanical testing to determine Compression-After-Impact (CAI) performance of each laminate. The CAI performance of the laminate with inter-ply PEKK DS-E film (55.1 KSI Avg.) is found to exceed that of the control (53.6 KSI Avg.)

Various patent and/or scientific literature references have been referred to throughout this application. The disclosures of these publications in their entireties are hereby incorporated by reference as if written herein to the extent that such disclosures are not inconsistent with the invention and for all jurisdictions in which such incorporation by reference is permitted. In view of the above description and the examples, one of ordinary skill in the art will be able to practice the invention as claimed without undue experimentation.

Although the foregoing description has been shown, described, and pointed out the fundamental novel features of the present teachings, it will be understood that various omissions, substitutions, and changes in the form of the compositions and processes as illustrated and described, may be made by those skilled in the art, without departing from the scope of the present teachings. Consequently, the scope of the present teachings should not be limited to the foregoing description, but should be defined by the appended claims.

The invention claimed is:

1. A thermoplastic tri-layer composite structure formed by a method comprising:
  applying a surface layer polymer on opposing surfaces of a core composite layer, said core composite layer comprising a fibrous substrate and one or more high performance polymers with greater than 20% crystallinity; and
  said surface layer polymer selected from a slow crystallizing semi-crystalline polymer with less than 20% crystallinity, or a blend of semi-crystalline polymer and an amorphous polymer,
  wherein the surface layer polymer is applied on opposing surfaces of said core composite layer to form a polymer blend with the high performance polymer of said core composite layer, and wherein the high performance polymer crystallizes at a faster rate than the surface layer polymer, whereby the high performance polymer nucleates and accelerates the crystallization rate of the surface layer polymer.

2. A thermoplastic tri-layer composite structure according to claim 1, wherein the fibrous substrate comprises fibers selected from a group consisting of carbon fibers, glass fibers, aramid fibers, and mixtures thereof and comprises from 50 to 80 weight percent of the total composite weight.

3. A thermoplastic tri-layer composite structure according to claim 1, wherein the high performance polymer and the surface layer polymer comprise polyetherketoneketones (PEKK) with different crystallization rates, and the crystallization rates are achieved by adjusting the terephthaloyl ("T") to isophthaloyl ("I") ratio.

4. A thermoplastic tri-layer composite structure according to claim 1, wherein the high performance polymer is polyaryletherketone (PAEK) or a PAEK polymer blend, and the surface layer polymer is PAEK or a PAEK polymer blend.

5. A thermoplastic tri-layer composite structure according to claim 1, wherein the surface layer polymer is applied at a thickness of 1 to 20 microns per layer.

6. A thermoplastic tri-layer composite structure according to claim 1, wherein the content of high performance polymer is from 26% to 90% by weight of the total polymer content in the composite structure.

7. A thermoplastic tri-layer composite structure according to claim 1, wherein the total polymer content is from 30% to 95% by weight of the total composite structure.

8. A thermoplastic tri-layer composite structure according to claim 7, wherein the total polymer content is from 32% to 42% by weight of the total composite structure.

9. A method for manufacturing a thermoplastic tri-layer composite structure having improved processing times and toughness, the method comprising:
  a) impregnating and/or coating a fibrous substrate with one or more high performance polymers thereby forming a core composite layer, said high performance polymer having greater than 20% crystallinity; and
  b) applying a surface layer polymer on opposing surfaces of said core composite layer at a thickness of 1 to 20 microns per layer, thereby forming a polymer blend with the high performance polymer of the core composite layer, said surface layer polymer being selected from a slow crystallizing semi-crystalline polymer having less than 20% crystallinity, or a blend of semi-crystalline polymer and an amorphous polymer,
  wherein the high performance polymer crystallizes at a faster rate than the surface layer polymer, whereby the high performance polymer nucleates and accelerates the crystallization rate of the surface layer polymer.

10. A method according to claim 9, wherein the thermoplastic tri-layer composite structure is in the form of an in-situ grade thermoplastic composite tape for use on an Automated Tape Laydown or Automated Fiber Placement machine.

11. A method according to claim 9, wherein the total polymer content is from 32% to 42% by weight of the total composite structure.

12. A method according to claim 9, wherein applying the surface layer polymer to the core composite layer is performed by: i) powder or solvent coating; ii) film lamination; iii) non-woven veil lamination; iv) flame or plasma spray coating; and v) combinations thereof.

13. A thermoplastic tri-layer composite structure according to claim 4, wherein the PAEK is selected from a group consisting of:
polyetheretherketone (PEEK), polyetheretherketoneketone (PEEKK), polyetherketoneketone (PEKK), polyetherketone (PEK), and polyetherketoneketoneetherketone (PEKKEK).

14. A thermoplastic tri-layer composite structure according to claim 1, wherein the surface layer polymer forms a surface layer having a fracture toughness $K_{1c}$ above 1.5 MPa-$m^{0.5}$.

15. A laminate comprising a plurality of thermoplastic tri-layer composite structures according to claim 1 laminated to each other in a lay-up arrangement.

16. A laminate comprising a plurality of thermoplastic tri-layer composite structures according to claim 5 laminated to each other in a lay-up arrangement.

17. The method according to claim 9, wherein the surface layer polymer forms a surface layer having a fracture toughness $K_{1c}$ above 1.5 MPa-$m^{0.5}$.

* * * * *